UNITED STATES PATENT OFFICE.

MORDUCH KOSS, OF ORANIENBURG, NEAR BERLIN, GERMANY, ASSIGNOR TO CHEMISCHE FABRIK GERMANIA GESELLSCHAFT MIT BESCHRANKTER HAFTUNG, OF ORANIENBURG, NEAR BERLIN, GERMANY.

PROCESS OF OBTAINING THORIUM.

1,069,959.  Specification of Letters Patent.  Patented Aug. 12, 1913.

No Drawing.  Application filed August 7, 1912.  Serial No. 713,839.

*To all whom it may concern:*

Be it known that I, MORDUCH Koss, a subject of the Czar of Russia, and a resident of Oranienburg, near Berlin, Germany, have invented a new and useful Process of Obtaining Thorium, of which the following is a specification.

My invention relates to the isolation of thorium and involves the chemical separation of thorium from the other rare earths and its object is to obtain this element in such form that it can be directly used for industrial purposes and to accomplish its separation from other rare earths in a simple and inexpensive manner, such as will produce a substantially pure product and will be capable of operation on an industrial scale.

The difficulty of obtaining thorium in a pure state, free from contamination with the other rare earths with which it is associated in nature, has greatly retarded the successful commercial use of this valuable element. The known methods of separating it from the other rare earths are complicated and expensive.

My invention is based upon the observation that the thorium salt of hypophosphoric acid is insoluble in water, acids and alkalis, but that the rare earths generally found associated with thorium, form in acids easily soluble compounds with hypophosphoric acid ($H_4P_2O_6$).

The process which constitutes my present invention consists, concisely stated, in treating the soluble rare earths in solution, with a substance which leaves the thorium solely in an insoluble and separately recoverable state.

More specifically, the process consists in preparing an acid solution of the rare earths, including thorium, and then treating the solution with hypophosphoric acid or its equivalents, such as the readily soluble salts thereof, for instance, sodium hypophosphate. The thorium precipitates out in a very pure state and in the form of a salt, as thorium hypophosphate, while the other rare earths remain in solution.

When I apply my invention to monazite, which may be in the form of a sand or powder, the following process, which is to be regarded as illustrative merely, may be carried out:—To the product formed by the treatment of 10 kilograms of monazite with a suitable quantity of sulfuric acid, 650 grams of sodium hypophosphate is added. The thorium will separate out in the form of a precipitate and may, of course, be treated to fit it for industrial uses in accordance with well-known processes.

It will be seen that my process is extremely simple and easy to carry out. It has the further advantage that the separation of thorium from the other rare earths and from the phosphoric acid such as is contained for example in monazite, takes place with great ease, whereas the methods heretofore pursued were all complicated and troublesome and decidedly more costly.

I wish it to be understood that when I speak in the claims of "hypophosphoric acid" I mean to include also its equivalents such as the readily soluble salts thereof, for instance, sodium hypophosphate.

I claim:

1. The process of obtaining thorium in a relatively pure state, which consists in subjecting an acid solution of thorium and other rare earths to a solution containing a substance capable of precipitating thorium, but no other rare earths, and collecting the thorium residue by removing the solution containing the dissolved rare earths.

2. The process of separating thorium from other rare earths, which consists in treating a solution of thorium and said other rare earths with a substance capable of precipitating the thorium, while incapable of precipitating the other rare earths, and separating the precipitated thorium from the solution containing the other rare earths.

3. The process of separating thorium from the other rare earths, which consists in treating an acid solution of thorium and said other rare earths with hypophosphoric acid.

4. The process of separating thorium from the other rare earths, which consists in treating a substance containing thorium and said other rare earths with an acid capable of dissolving the thorium and then treating the solution thus formed with hypophosphoric acid.

5. The process of obtaining thorium from monazite which consists in treating monazite with sulfuric acid and then treating the product thus formed with hypophosphoric acid.

In testimony whereof I have hereunto set my hand in the presence of two subscribing witnesses.

MORDUCH KOSS.

Witnesses:
　WOLDEMAR HAUPT,
　HENRY HASPER.